(12) United States Patent
Castano

(10) Patent No.: US 9,974,282 B2
(45) Date of Patent: May 22, 2018

(54) PET WASTE COLLECTION DEVICE

(71) Applicant: Carlos Castano, Elmhurst, NY (US)

(72) Inventor: Carlos Castano, Elmhurst, NY (US)

( * ) Notice: Subject to any disclaimer, the term of this patent is extended or adjusted under 35 U.S.C. 154(b) by 0 days. days.

(21) Appl. No.: 15/435,196

(22) Filed: Feb. 16, 2017

(65) Prior Publication Data
US 2017/0339921 A1    Nov. 30, 2017

Related U.S. Application Data

(60) Provisional application No. 62/295,766, filed on Feb. 16, 2016.

(51) Int. Cl.
| A01K 29/00 | (2006.01) |
| A01K 23/00 | (2006.01) |
| E01H 1/08  | (2006.01) |
| E01H 1/12  | (2006.01) |

(52) U.S. Cl.
CPC ......... *A01K 23/005* (2013.01); *E01H 1/0836* (2013.01); *E01H 1/1206* (2013.01)

(58) Field of Classification Search
CPC ... A01L 23/005; E01H 1/0836; E01H 1/1206; E01H 1/006; E01H 1/12; E01H 2001/1293
USPC ............................. 294/1.4, 1.3, 1.5, 184, 186
See application file for complete search history.

(56) References Cited

U.S. PATENT DOCUMENTS

| 4,253,691 A * | 3/1981 | Liu ........................ E01H 1/1206 294/1.4 |
| 4,286,816 A * | 9/1981 | Tobias .................. E01H 1/1206 294/1.4 |
| 4,478,448 A * | 10/1984 | Albert ................... E01H 1/0836 15/341 |
| 4,819,977 A * | 4/1989 | Cooper ................. E01H 1/1206 294/1.4 |
| 5,661,873 A * | 9/1997 | Karet ........................ A47L 5/14 15/344 |
| 6,131,239 A * | 10/2000 | White ..................... A01G 1/125 15/327.5 |
| 6,196,601 B1 * | 3/2001 | Juntunen, Jr. ......... E01H 1/1206 294/1.4 |
| 6,883,400 B2 * | 4/2005 | Sugano ..................... H01K 3/32 294/184 |
| 7,226,098 B1 * | 6/2007 | Moreira ................ E01H 1/1206 294/1.4 |
| 7,703,170 B2 * | 4/2010 | Orubor ..................... A47L 5/24 15/320 |

(Continued)

*Primary Examiner* — Gabriela M Puig
(74) *Attorney, Agent, or Firm* — Ruth Eure

(57) ABSTRACT

A pet waste collection device for collecting and discarding animal waste is provided. The device comprises a shaft with a vacuum head mounted to the shaft. A vacuum motor is mounted within the vacuum head. A nozzle is connected to the shaft and the vacuum motor provides a suction to the second end of the nozzle. A retractable claw member having a plurality of extendable claw fingers extends from the nozzle. A waste bag is positioned within the claw member. An access port is formed in the vacuum handle. Upon collection of the pet waste in the waste bag, the claw fingers close as the claw member retracts into the nozzle, the open end of the waste bag closing shut. The bagged pet waste is suctioned by the vacuum motor through the shaft to a waste bag receptacle within the vacuum handle and removable from the receptacle through the access port.

20 Claims, 2 Drawing Sheets

(56) References Cited

U.S. PATENT DOCUMENTS

| | | | | |
|---|---|---|---|---|
| 8,196,980 B1* | 6/2012 | Banks | A01K 23/005 | 294/1.3 |
| 8,925,495 B1* | 1/2015 | Lee | E01H 1/1206 | 119/161 |
| 9,187,871 B1* | 11/2015 | Contreras | E01H 1/1206 | |
| 2003/0146631 A1* | 8/2003 | Stoev | A01K 1/01 | 294/1.4 |
| 2004/0135386 A1* | 7/2004 | Pineda | E01H 1/1206 | 294/1.4 |
| 2006/0214441 A1* | 9/2006 | Lopoukhine | E01H 1/1206 | 294/1.4 |
| 2007/0024070 A1* | 2/2007 | Aihiokhai | E01H 1/0845 | 294/1.4 |
| 2008/0061569 A1* | 3/2008 | Bowes | E01H 1/1206 | 294/1.3 |
| 2009/0050065 A1* | 2/2009 | Evans | E01H 1/1206 | 119/161 |
| 2009/0200812 A1* | 8/2009 | Mambru | E01H 1/1206 | 294/1.4 |
| 2010/0176611 A1* | 7/2010 | Merino-Garcia | E01H 1/1206 | 294/1.3 |
| 2012/0256430 A1* | 10/2012 | Merino-Garcia | E01H 1/1206 | 294/1.3 |
| 2014/0152031 A1* | 6/2014 | Ballacchino | E01H 1/1206 | 294/1.3 |
| 2014/0152033 A1* | 6/2014 | Wilson | E01H 1/1206 | 294/1.4 |
| 2014/0159398 A1* | 6/2014 | Reynolds | B01D 46/02 | 294/1.3 |
| 2015/0114433 A1* | 4/2015 | Rivadeneira | E01H 1/0836 | 134/21 |
| 2016/0369462 A1* | 12/2016 | McFadden | E01H 1/0836 | |
| 2017/0037589 A1* | 2/2017 | Rivadeneira | E01H 1/0836 | |

* cited by examiner

PET WASTE COLLECTION DEVICE

CLAIM OF PRIORITY

This patent application claims priority under 35 USC 119(e)(1) from U.S. Provisional Patent Application Ser. No. 82/295,786 filed Feb. 16, 2016, of common inventorship herewith entitled, "EZ Scoop," which is incorporated herein by reference as though the same were set forth in its entirety.

FIELD OF THE INVENTION

The present invention pertains to the field of pet supplies, and more specifically to the field of pet supplies especially pet waste collection devices incorporating a portable, rechargeable, and lightweight claw, vacuum, bagging, and disposal system.

BACKGROUND OF THE INVENTION

Dogs provide unconditional love, companionship and unmatched loyalty to their human owners. Known as man's best friend, dogs offer protection and are faithful and constant friends. Although a dog is a delightful addition to any family, cleaning up after them is unpleasant at best. Collecting and disposing of their pet's fecal matter is a disagreeable task yet most conscientious dog owners realize that it must be done. Pet owners who live in cities and suburban areas are required by laws and local ordinances to remove dog waste from sidewalks and lawns immediately after the animal has answered the call of nature. For those owners who live in less populated areas, removing pet waste is a key factor in maintaining an attractive and clean yard.

Many pet owners collect their dog's waste in a plastic bag or tissue paper. Other owners collect dog waste through use of a pet snooper. Scoopers offer a hands free means of picking up after one's pet, but their handles are short and their use requires a person to stoop to the ground in to retrieve the waste. For those with physical limitations such as back or knee problems, bending or stooping over to clean up after an animal can cause pain and discomfort. Once waste is collected within the scooper, the user is faced with a challenge of emptying the scooper of its contents, usually an unhygienic and unsettling endeavor.

The prior art has put forth several designs for poop scoopers. Among these are:

U.S. Pat. No. 7,703,170 to Lawrence Orubor describes a self-cleaning wet dry vacuum cleaning device for collecting and disposing of waste material and specifically animal waste. The device includes a waste collection system for collecting and breaking up the waste. The waste collection system includes a self cleaning intake nozzle, a vacuum in communication with the waste collection system for providing suction to the intake nozzle, a waste storage system in communication with the vacuum for storing waste vacuumed Into the intake nozzle, and a fluid dispensing system having a fluid reservoir including a piston system. The piston system consistently dispenses fluid from the fluid reservoir to the intake nozzle and a leash system, all of which are ail integrated with or removably engageable with the device's body.

U.S. Pat. No. 5,661,873 to Ted Michael Karet describes a vacuum system which provides a compact power device that can accept and pass the full range of expected debris and waste from the pickup nozzle to the container and which directs the major portion of the exhaust air including entrained dust particles away from the user. The invention discloses disposable pick up tubes and storage containers which are low cost and easy to use which achieve their purposes of picking up, storing and disposing of waste and debris simply and easily.

U.S. Pat. No. 4,478,448 to Karmen D. Albert describes an animal excrement removal device which includes an excrement containing shaft adapted to receive and retain the excrement. A piston generates sufficient suction to draw the excrement into the shaft. A priming device actuates the piston, and a trigger releases the piston from its actuated position and generates sufficient suction in the shaft to draw the excrement therein. The shaft is baffled to prevent the excrement from being drawn up into the piston. Alternatively, a disposable bag is utilizable within the shaft to assist the owner in readily disposing of the excrement. The priming device is mechanically or electrically assisted.

None of these prior art references describe the present invention.

SUMMARY OF THE INVENTION

It is an object of the present Invention to provide a pet waste collection device configured in the form of a portable, rechargeable, and lightweight claw member, vacuum, bagging, and disposal system.

The present invention is a pet waste collection device for collecting and discarding animal waste. The pet waste collection device comprises a tubular, elongated shaft having a first end and a second end with a vacuum head mounted to the first end of the shaft. A vacuum motor is mounted within the vacuum head. A nozzle is provided having a first end and a second end with the first end of the nozzle connected to the second end of the shaft and the vacuum motor providing a suction to the second end of the nozzle. A retractable claw member extends from the second end of the nozzle with the claw member having a plurality of extendable claw fingers. A waste bag is positioned within the claw member with an open end of the waste bag positioned about the claw fingers. An access port is formed in the vacuum handle. Upon collection of the pet waste in the waste bag, the claw fingers close as the claw member retracts into the nozzle, the open end of the waste bag closing shut. The bagged pet waste is suctioned by the vacuum motor through the shaft to a waste bag receptacle within the vacuum handle and removable from the receptacle through the access port. Pet waste is retrievable without a need to bend over and handle pet waste or a soiled pet waste bag.

In addition, the present invention includes a method for collecting and discarding animal waste. The method comprises providing a tubular, elongated shaft having a first end and a second end, mounting a vacuum head to the first end of the shaft, mounting a vacuum motor within the vacuum head, providing a nozzle having a first end and a second end, connecting the first end of the nozzle to the second end of the shaft, extending a retractable claw member from the second end of the nozzle, providing a plurality of openable claw fingers on the claw member, positioning a waste bag within the claw member with an open end of the waste bag positioned about the claw fingers, forming an access port formed in the vacuum handle, providing a suction to the second end of the nozzle, collecting the pet waste in the waste bag, closing the claw fingers as the claw member retracts into the nozzle, closing the open end of the waste bag, suctioning the bagged pet waste through the shaft to a waste bag receptacle within the vacuum handle, and removing the bagged pet waste from the receptacle through the access port.

The present invention further includes a pet waste collection device for collecting and discarding animal waste. The pet waste collection device comprises a tubular, elongated, telescoping shaft having a first end and a second end with a vacuum head mounted to the first end of the shaft. An integrated handgrip is formed in the vacuum head. A vacuum motor is mounted within the vacuum head. A nozzle is provided having a first end and a second end with the first end of the nozzle connected to the second end of the shaft and the vacuum motor providing a suction to the second end of the nozzle. A retractable claw member extends from the second end of the nozzle with the claw member having a plurality of extendable claw fingers. A waste bag is positioned within the claw member with an open end of the waste bag positioned about the claw fingers. An access port is formed in the vacuum handle. Upon collection of the pet waste in the waste bag, the claw fingers close as the claw member retracts into the nozzle, the open end of the waste bag closing shut. The bagged pet waste is suctioned by the vacuum motor through the shaft to a waste bag receptacle within the vacuum handle and removable from the receptacle through the access port. Pet waste is retrievable without a need to bend over and handle pet waste or a soiled pet waste bag.

DETAILED DESCRIPTION OF THE INVENTION

Figure 1:
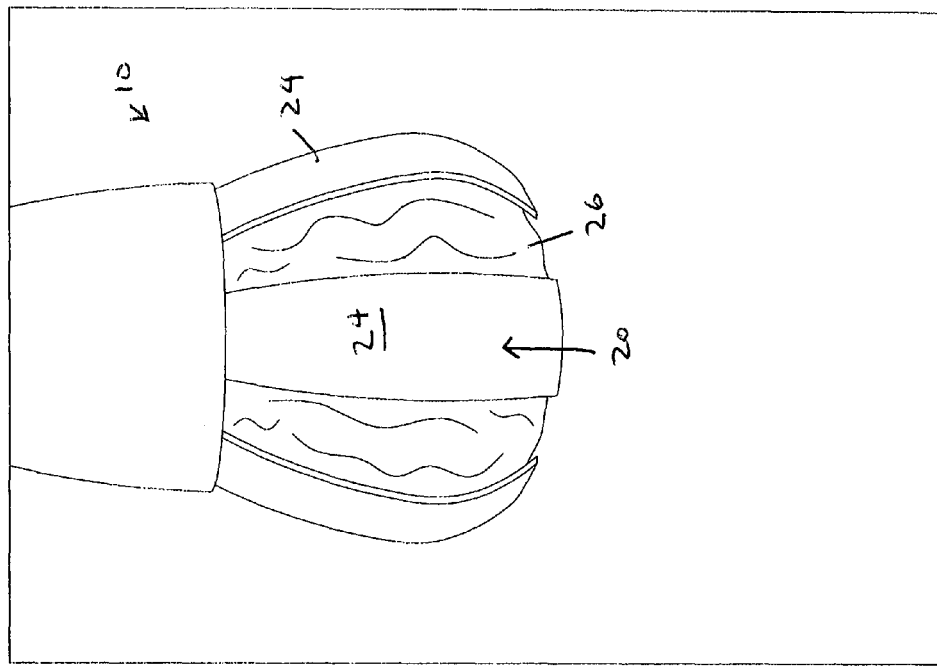
FIG. 1 is a perspective view illustrating a pet waste collection device, constructed in accordance with the present invention, including a hollow shaft, a single handle grip, a top receptacle and access port exit for waste bags, a vertical vacuum powered handle, and a nozzle with a claw member extending therefrom.
Figure 2:
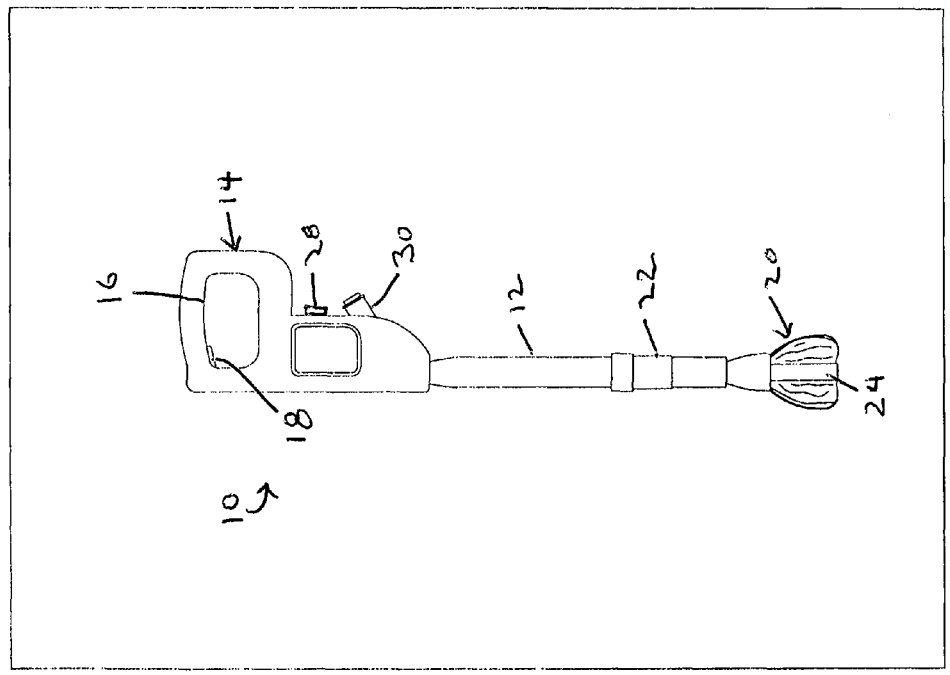
FIG. 2 is a perspective view illustrating the claw member extending from the nozzle of the pet waste collection device, constructed in accordance with the present invention.
Figure 4:
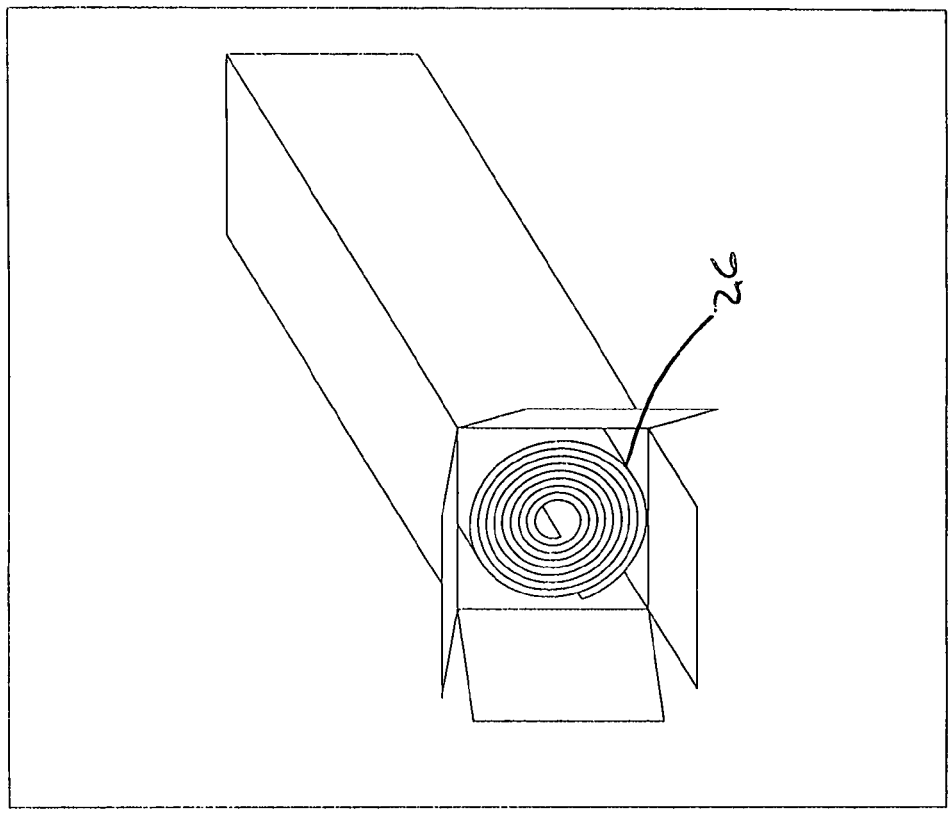
FIG. 4 shows a perspective view of a box containing a roll of reliable bags for the pet waste collection device, constructed in accordance with the present invention, that are loaded singly into the daw member and nozzle component.
Figure 3:
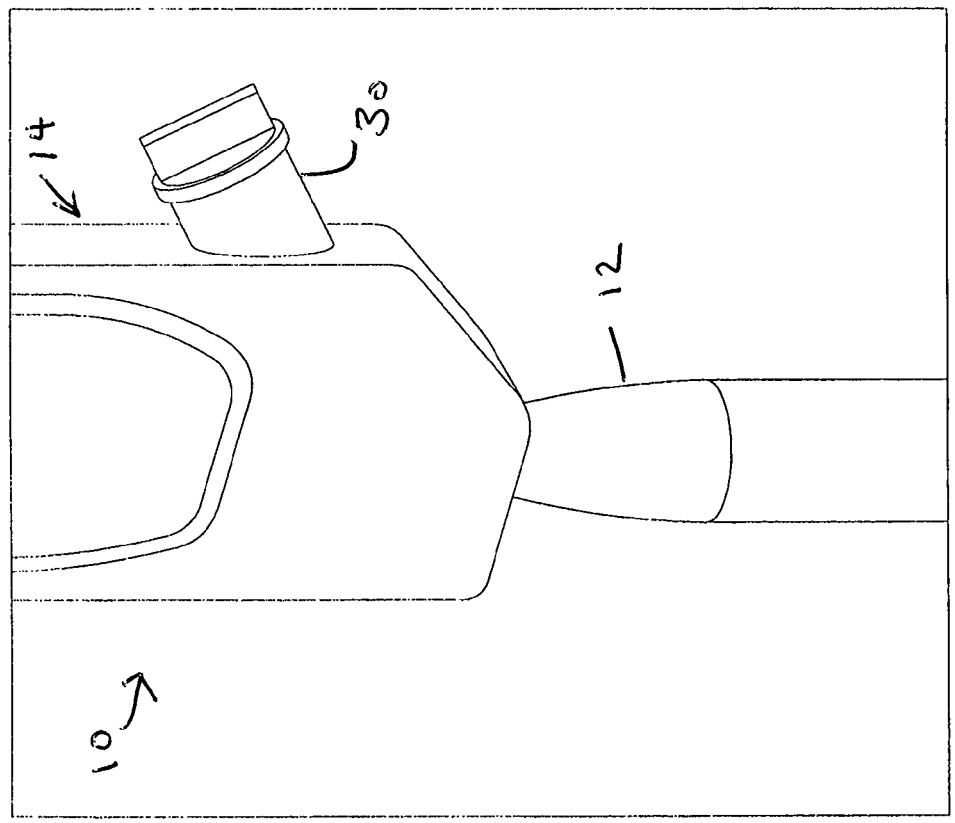
FIG. 3 is a perspective view illustrating the top receptacle and access port exit for waste bags in the top receptacle of the pet waste collection device, constructed in accordance with the present invention.

The present invention, hereinafter a Pet Waste Collection Device, indicated generally at 10, is a dog waste collection device configured in the form of a portable, rechargeable, and lightweight claw member, vacuum, bagging, and disposal system. The Pet Waste Collection Device 10 provides users an easy means of single handedly collecting and discarding animal waste without a need to bend over and handle pet waste or a soiled pet waste bag. The Pet Waste Collection Device 10 enables a user to retrieve pet waste while comfortably standing upright.

The portable Pet Waste Collection Device 10 of the present invention includes a tubular, elongated shaft 12 having a first end and a second end. The shaft 12 is preferably a long, comparatively straight handle serving as an important or balancing part of the Pet Waste Collection Device 10. Preferably, expanding and contracting to accommodate users of various heights, the shaft 12 has a plurality of telescoping sections allowing the shaft 12 to be adjustable between approximately three (3') feet and four (4') feet in length although being adjustable less than three (3') feet and four (4') feet in length or greater than three (3') feet and four (4') feet in length is within the scope of the present invention. A simple locking mechanism releasably secures the telescoping sections of the shaft 12 at a designated, desired length. The locking mechanism can include, but not limited to, friction or other mechanical means.

In addition, the Pet Waste Collection Device 10 of the present invention includes a specially configured vacuum head 14 mounted to the first end of the shaft 12. The vacuum head 14 comprises an integrated handgrip 16 that enables a user to comfortably carry the Pet Waste Collection Device 10. The vacuum head 14 further houses operational machinations including a lightweight vacuum motor configured expressly to provide a powerful suction force to a circular vacuum nozzle 22 mounted to the second end of the shaft 12. Operational controls 18 are positioned within an easily accessed location on the vacuum head 14 for activating the vacuum motor and expanding and retracting a claw member 20, as will be described further below.

The nozzle 22 of the Pet Waste Collection Device 10 of the present invention has a first end and a second end with the first end of the nozzle 22 connected to the second end of the shaft 12. The nozzle 22 is an elongated and cylindrical component measuring approximately three (3") inches in diameter and easily accommodating waste matter of variously sized dog breeds. Larger nozzles 22 are available for large dogs. The nozzle 22 is preferably retractable and extendable, enabling a user to extend the nozzle 22 to access hard to reach waste matter.

Additionally, the Pet Waste Collection Device 10 of the present invention includes the retractable claw member 20 extending from the second end of the nozzle 22 to collect and retrieve pet waste. The retractable claw member 2D is incorporated in the nozzle 22 and has a plurality of extendable claw fingers 24 which extend from the nozzle 22 and function to scoop pet waste into a disposable preloaded waste bag 26. The waste bag 26 is positioned within the claw member 20 with the open end of the waste bag 26 positioned about the claw fingers 24. Once the pet waste is collected in the waste bag 26, the claw fingers 24 close as the claw member 20 retracts back into the nozzle 22 where the waste is further suctioned through the shaft 12 and into a waste bag receptacle formed or mounted within the vacuum handle 14 at the top of the Pet Waste Collection Device 10. In an embodiment, a push button ejector switch 28 dispels the bagged waste matter from the waste bag receptacle through an access port 30 into an appropriate trash receptacle following use, facilitating a hands free disposal. Dispelling the bagged waste matter through the access port 30 can be accomplished by activatingly reversing the vacuum motor to a blower to blow the bagged waste matter from the waste bag receptacle or a mechanical ejection mechanism can be constructed within the waste bag receptacle to mechanically remove the bagged waste matter. Or, in the alternative, the bagged waste matter can be removed through the access port 30 manually by the hand of the user.

The Pet Waste Collection Device 10 of the present invention is operated by a rechargeable battery housed within the vacuum handle 14. Included for use with the Pet Waste Collection Device 10 are pet waste collection bags 26, sized and shaped appropriately to line the vacuum nozzle 22 so pet waste is deposited directly Into the waste bag 26 when collected and suctioned off the ground. Offered in roll form, the waste bags 26 are loaded singly into the aforementioned bag receptacle compartment housed within the vacuum handle 14. The Pet Waste Collection Device 10 is preferably comprised primarily of a heavy duty ABS plastic material.

Use of the Pet Waste Collection Device 10 of the present invention is simple and straight forward. After making sure if is properly charged, the Pet Waste Collection Device 10 is ready for use. A user first installs a waste collection bag 26 within the claw member 20 mounted to the retractable vacuum nozzle 22 at the distal end of the Pet Waste Collection Device 10. Grasping the Pet Waste Collection Device 10 by its adjustable handle 18, the user walks their dog as usual After the dog eliminates waste, the user extends the lined nozzle 22 of the vacuum and positions the nozzle spout 22 over the waste. Upon activation of the Pet Waste Collection Device 10, the extendable claw members 20 emerge from the vacuum nozzle, grasp and lift the waste matter off the ground and direct the waste back towards the nozzle 22 where it is quickly suctioned into the Pet Waste Collection Device 10. As the pet waste is suctioned through the Pet Waste Collection Device 10, it is ensconced within the waste collection bag 26. The user shuts the vacuum off. Walking to the nearest trash receptacle, the user simply ejects the filled bag directly into the trash bin. The user lines the Pet Waste Collection Device 10 with a fresh collection bag 26 and repeats the process as needed. After using, the Per Waste Collection Device 10 is stored away until again needed.

A lightweight and completely portable vacuum which swiftly removes waste from sidewalks, gravel or grass, the Pet Waste Collection Device 10 of the present invention provides dog owners with a clean and sanitary method of collection. With an extendable shaft 12 and nozzle 22 that easily bridges the distance from a standing user to the ground below, the engineering of the Pet Waste Collection Device 10 allows users to gather dog waste without having to bend over or stoop on their knees, very effective for dog owners who suffer limited mobility, arthritis, knee problems or back pain. Durably constructed of heavy duty materials and powered by a rechargeable battery, the Pet Waste Collection Device 10 will withstand repeated use, with ease.

Although this Invention has been described with respect to specific embodiments, it Is not intended to be limited thereto and various modifications which will become apparent to the person of ordinary skill in the art are Intended to fall within the spirit and scope of the Invention as described herein taken in conjunction with the accompanying drawings and the appended claims.

The invention claimed is:

1. A pet waste collection device for collecting and discarding animal waste, the pet waste collection device comprising;
   a tubular, elongated shaft having a first end and a second end;
   a vacuum head mounted to the first end of the shaft;
   a vacuum motor mounted within the vacuum head;
   a nozzle having a first end and a second end; the first end of the nozzle connected to the second end of the shaft, the vacuum motor providing a suction to the second end of the nozzle;
   a retractable claw member extending from the second end of the nozzle, the claw member having a plurality of extendable claw fingers,
   a waste bag positionable within the claw member with an open end of the waste bag positioned about the claw fingers; and
   an access port formed in a vacuum handle;
   wherein upon collection of the pet waste in the waste bag, the claw fingers close as the claw member refracts into the nozzle, the open end of the waste bag closing shut;
   wherein the bagged pet waste is suctioned by the vacuum motor through the shaft to a waste bag receptacle within the vacuum handle and removable from the receptacle through the access port; and
   wherein pet waste is retrievable without a need to bend over and handle pet waste or a soiled pet waste bag.

2. The pet waste collection device of claim 1 wherein the shaft includes a plurality of telescoping sections allowing the shaft to be adjustable between approximately three (3') feet and four (4') feet in length.

3. The pet waste collection device of claim 2 wherein the telescoping sections are releasably secured at a desired length by a locking mechanism.

4. The pet waste collection device of claim 3 wherein the locking mechanism is friction.

5. The pet waste collection device of claim 1 and further comprising:
   an integrated handgrip formed in the vacuum head.

6. The pet waste collection device of claim 1 and further comprising:
   operational controls positioned on the vacuum head, the operational controls controlling the vacuum motor and the extension and retraction of the claw member.

7. The pet waste collection device of claim 1 wherein the nozzle is retractable.

8. The pet waste collection device of claim 1 and further comprising:
   a push button ejector switch for dispelling the bagged waste matter from the waste bag receptacle through the access port.

9. The pet waste collection device of claim 8 wherein the bagged pet waste is removable from the waste bag receptacle by reversing the vacuum motor to a blower to blow the bagged pet waste through the access port.

10. The pet waste collection device of claim 1 and further comprising:
    a rechargeable battery housed within the vacuum handle.

11. The pet waste collection device of claim 1 wherein the waste bags are in roll form, the waste bags being loaded singly into the bag receptacle compartment housed within the vacuum handle.

12. A method for collecting and discarding animal waste, the method comprising:
    providing a tubular, elongated shaft having a first end and a second end;
    mounting a vacuum head to the first end of the shaft;
    mounting a vacuum motor within the vacuum head;
    providing a nozzle having a first end and a second end;
    connecting the first end of the nozzle to the second end of the shaft;
    extending a retractable claw member from the second end of the nozzle;
    providing a plurality of openable claw fingers on the claw member;
    positioning a waste bag within the claw member with an open end of the waste bag positioned about the claw fingers;
    forming an access port formed in a vacuum handle;
    providing a suction to the second end of the nozzle;
    collecting the pet waste in the waste bag;
    closing the claw fingers as the claw member retracts into the nozzle;
    closing the open end of the waste bag;

suctioning the bagged pet waste through the shaft to a waste bag receptacle within the vacuum handle; and removing the bagged pet waste from the receptacle through the access port.

13. A pet waste collection device for collecting and discarding animal waste, the pet waste collection device comprising:

a tubular, elongated, telescoping shaft having a first end and a second end;

a vacuum head mounted to the first end of the shaft;

an integrated handgrip formed in the vacuum head;

a vacuum motor mounted within the vacuum head;

a nozzle having a first end and a second end, the first end of the nozzle connected to the second end of the shaft, the vacuum motor providing a suction to the second end of the nozzle;

a retractable claw member extending from the second end of the nozzle, the claw member having a plurality of extendable claw fingers;

a waste bag positionable within the claw member with an open end of the waste bag positioned about the claw fingers; and an access port formed in a vacuum handle;

wherein upon collection of the pet waste in the waste bag, the claw fingers close as the claw member retracts into the nozzle, the open end of the waste bag closing shut;

wherein the bagged pet waste is suctioned by the vacuum motor through the shaft to a waste bag receptacle within the vacuum handle and removable from the receptacle through the access port; and wherein pet waste is retrievable without a need to bend over and handle pet waste or a soiled pet waste bag.

14. The pet waste collection device of claim 13 wherein the shaft is adjustable between approximately three (3') feet and four (4') feet in length.

15. The pet waste collection device of claim 14 wherein the telescoping sections are releasably secured at a desired length by a locking mechanism.

16. The pet waste collection device of claim 15 wherein the locking: mechanism is friction.

17. The pet waste collection device of claim 13 and further comprising:

operational controls positioned on the vacuum head, the operational controls controlling the vacuum motor and the extension and retraction of the claw member.

18. The pet waste collection device of claim 13 wherein the nozzle is retractable.

19. The pet waste collection device of claim 13 and further comprising:

a push button ejector switch for dispelling the bagged waste matter from the waste bag receptacle through the access port;

wherein the bagged pet waste is removable from the waste bag receptacle by reversing the vacuum motor to a blower to blow the bagged pet waste through the access port.

20. The pet waste collection device of claim 13 and further comprising;

a rechargeable battery housed within the vacuum handle.

* * * * *